(12) United States Patent
Raggam et al.

(10) Patent No.: US 7,926,728 B2
(45) Date of Patent: Apr. 19, 2011

(54) INTEGRATED CIRCUIT DEVICE INCLUDING A CONTACTLESS INTEGRATED CIRCUIT INLAY

(75) Inventors: Peter Raggam, St. Stefan (AT); Thomas Grieshofer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 728 days.

(21) Appl. No.: 11/931,612

(22) Filed: Oct. 31, 2007

(65) Prior Publication Data

US 2009/0108974 A1 Apr. 30, 2009

(51) Int. Cl.
*G06K 19/06* (2006.01)
(52) U.S. Cl. ....................................................... 235/492
(58) Field of Classification Search .................. 235/487, 235/492; 340/572.1–572.9, 10.1–10.6
See application file for complete search history.

(56) References Cited

U.S. PATENT DOCUMENTS

| | | | | |
|---|---|---|---|---|
| 5,337,063 A | * | 8/1994 | Takahira | 343/741 |
| 5,436,441 A | * | 7/1995 | Inoue | 235/487 |
| 5,999,409 A | | 12/1999 | Ando et al. | |
| 6,373,708 B1 | | 4/2002 | Ando et al. | |
| 6,375,083 B2 | | 4/2002 | Fries et al. | |
| 6,622,921 B2 | * | 9/2003 | Altwasser et al. | 235/492 |
| 6,898,070 B2 | | 5/2005 | Korony et al. | |
| 7,202,790 B2 | * | 4/2007 | Copeland et al. | 340/572.7 |

FOREIGN PATENT DOCUMENTS

| | | |
|---|---|---|
| DE | 19633923 A1 | 2/1998 |
| DE | 19820234 A1 | 11/1999 |
| DE | 10056148 A1 | 5/2002 |

* cited by examiner

*Primary Examiner* — Jamara A Franklin
(74) *Attorney, Agent, or Firm* — Dicke, Billig & Czaja, PLLC

(57) ABSTRACT

Embodiments provide an integrated circuit device including a contactless integrated circuit inlay. The device includes a substrate, an integrated circuit coupled to the substrate, and a coil electrically coupled to the integrated circuit and coupled to the substrate. The coil includes a first conductive line disposed in multiple turns on the substrate and a second conductive line disposed in multiple turns on the substrate.

25 Claims, 7 Drawing Sheets

INTEGRATED CIRCUIT DEVICE INCLUDING A CONTACTLESS INTEGRATED CIRCUIT INLAY

BACKGROUND

Integrated circuit cards have proven useful as a storage medium that enables data processing in cashless purchases, monitoring passenger traffic, and/or charge management in accessing telephone networks.

Generally, there are two types of integrated circuit cards, each having a different signal transmission method. One type is a contact integrated circuit card that receives power and clocks from a reader/writer by use of a contact point that processes a command from the reader/writer. The second type is a contactless integrated circuit card having a coil and an integrated circuit connected to the coil, where the card communicates wirelessly with a reader/writer. A coil of the reader/writer generates a magnetic field to power the card. The coil of the contactless integrated circuit card electromagnetically couples with the coil of the reader/writer to enable bi-directional data and power transfer. The contactless integrated circuit card has no moving parts to wear out and is inexpensive to manufacture.

Inductance from the coil and capacitance of the integrated circuit combine to form a resonance circuit that enables power transmission between the contactless reader/writer and the contactless integrated circuit card. It is desirable to adjust the coil inductance and the chip capacitance to enable the efficient power and data transfer between the reader/writer and the card.

As contactless integrated circuit cards become smaller (and more popular), each card size will necessitate a different optimum inductance value and different capacitance values for the integrated circuit. Thus, these advances will demand many different chip types each having different input capacitance values.

For these and other reasons there is a need for the present invention.

SUMMARY

One aspect provides an integrated circuit device including a contactless integrated circuit inlay. The device includes a substrate, an integrated circuit coupled to the substrate, and a coil electrically coupled to the integrated circuit and coupled to the substrate. The coil includes a first conductive line disposed in multiple turns on the substrate and a second conductive line disposed in multiple turns on the substrate.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise. As employed in this Specification, the term "electrically coupled" is not meant to mean that the elements must be directly coupled together; intervening elements may be provided between the "electrically coupled" elements.

Embodiments provide a contactless integrated circuit inlay including a chip and a coil that is configured to be tuned to optimize coil inductance, capacitance, and power transfer from the card to a reader. Embodiments provide a coil that includes an antenna portion and a sandwiched turn capacitance line capacitor. The line capacitor is configured to be tuned by adjusting a length of a conductor line, by selecting a width of the conductor line, and selecting a gap between adjacent conductor lines. For example, the antenna portion has an inductance value that is defined in part by its structure (e.g., a four-turn or similar structure). After optimizing a desired inductance value of the antenna portion for a desired size of inlay, the line capacitor is adjusted or tuned for a capacitance value that results in a desired resonance frequency for the inlay. In some embodiments, the inductance of the coil is configured to be adjusted to provide high capacitance values merely by changing the length of one or more of the conductor lines.

Figure 1:
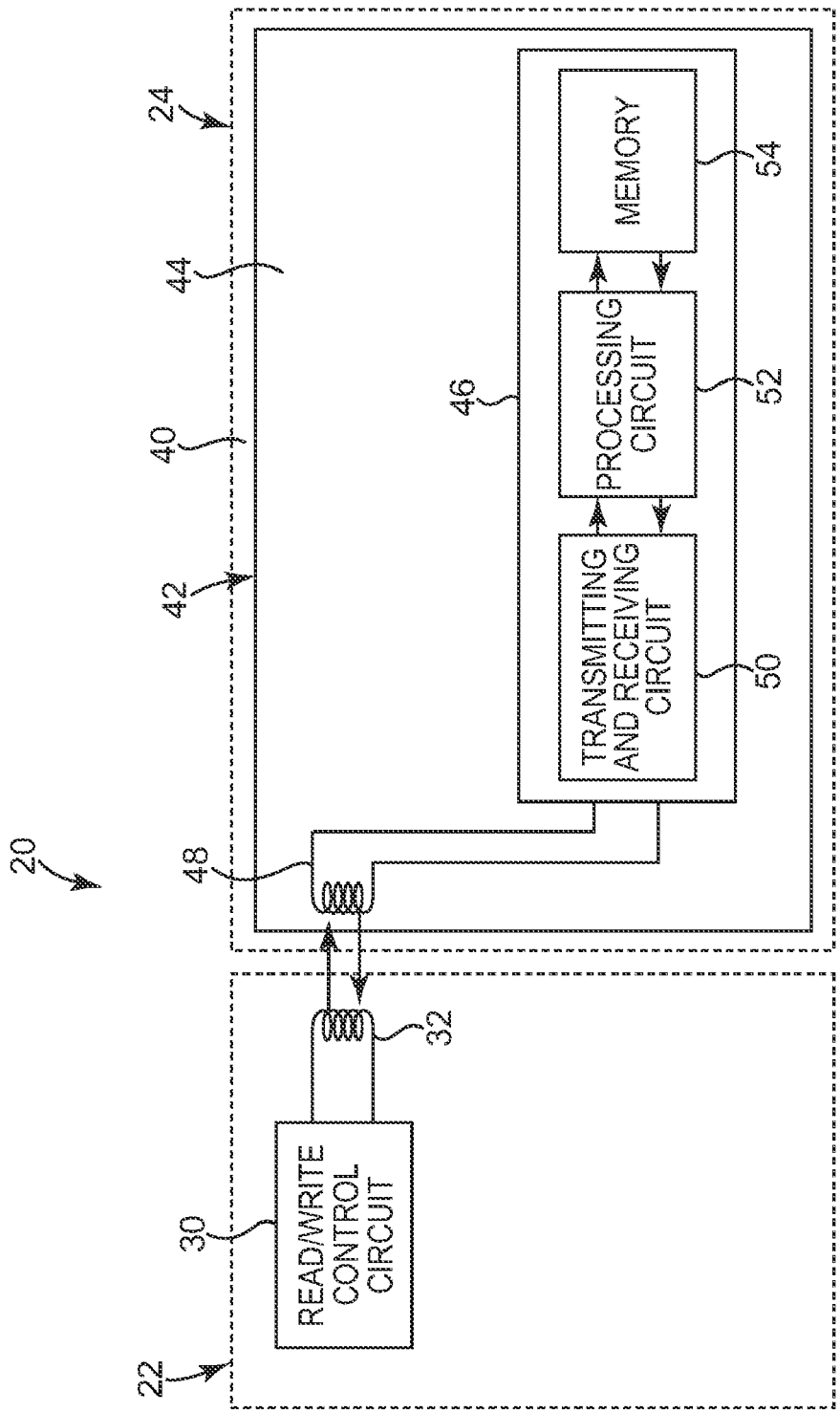
FIG. 1 is a block diagram of a contactless information read/write system including a reader/writer and a contactless integrated circuit card according to one embodiment.

FIG. 1 is a block diagram of a contactless information read/write system 20 according to one embodiment. The contactless information read/write system 20 includes a reader/writer 22 and a card 24 that is configured to transfer information with the reader/writer 22 in a contactless manner. In one embodiment, reader/writer 22 includes read/write control circuitry 30 coupled to a reader coil 32 that is configured to generate electromagnetic (EM) waves and transmit commands and power to card 24.

In one embodiment, card 24 includes a carrier 40 and an integrated circuit inlay 42 disposed on carrier 40. Carrier 40 includes flexible wallet sized tickets, passports, electronic payment cards, electronic passports, and other electronic devices useful in conducting e-business. In one embodiment, carrier 40 is approximately credit card size provided in an approximately rectangular shape having dimensions of about 85×54 millimeters. Other suitable sizes for carrier 40 are also acceptable. In other embodiments, card 24 is provided by inlay 42 alone.

Inlay 42 provides proximity circuitry configured for quickly processing electronic transactions in a contactless manner at a distance away from reader 22. In one embodiment, inlay 42 conforms to ISO 14443 and includes type A contactless inlays and type B contactless inlays configured to communicate at distances up to about 10 centimeters. In one embodiment, inlay 42 includes a substrate 44, an integrated circuit (or chip) 46 coupled to substrate 44, and a coil 48 electrically coupled to chip 46 and coupled to substrate 44.

In one embodiment, substrate 44 is a paper substrate or other thin and flexible substrate. One suitable substrate includes a 3 mil paper substrate that is thin enough to be carried in a wallet and flexible enough for use as an e-passport or e-business transaction slip.

In one embodiment, chip 46 includes a transmitting and receiving circuit 50, a processing circuit 52, and memory 54. Suitable chips include electrically erasable programmable read-only (EEPROM) memory chips available from, for example, Infineon North America. Other suitable chips available from, for example, Atmel Corporation, are also acceptable.

During a contactless information transaction, coil 48 receives electromagnetic waves generated from coil 32, and card 24 inductively couples with reader/writer 22 to transmit and/or receive data signals to/from reader 22. In one embodiment, card 24 is a passive card that is selectively energized to an "on" state when the EM waves from coil 32 are received by coil 48. In other embodiments, card 24 is an active card and chip 46 includes a power source circuit and a battery that is configured to drive the transmitting and receiving circuit 50.

Figure 2:
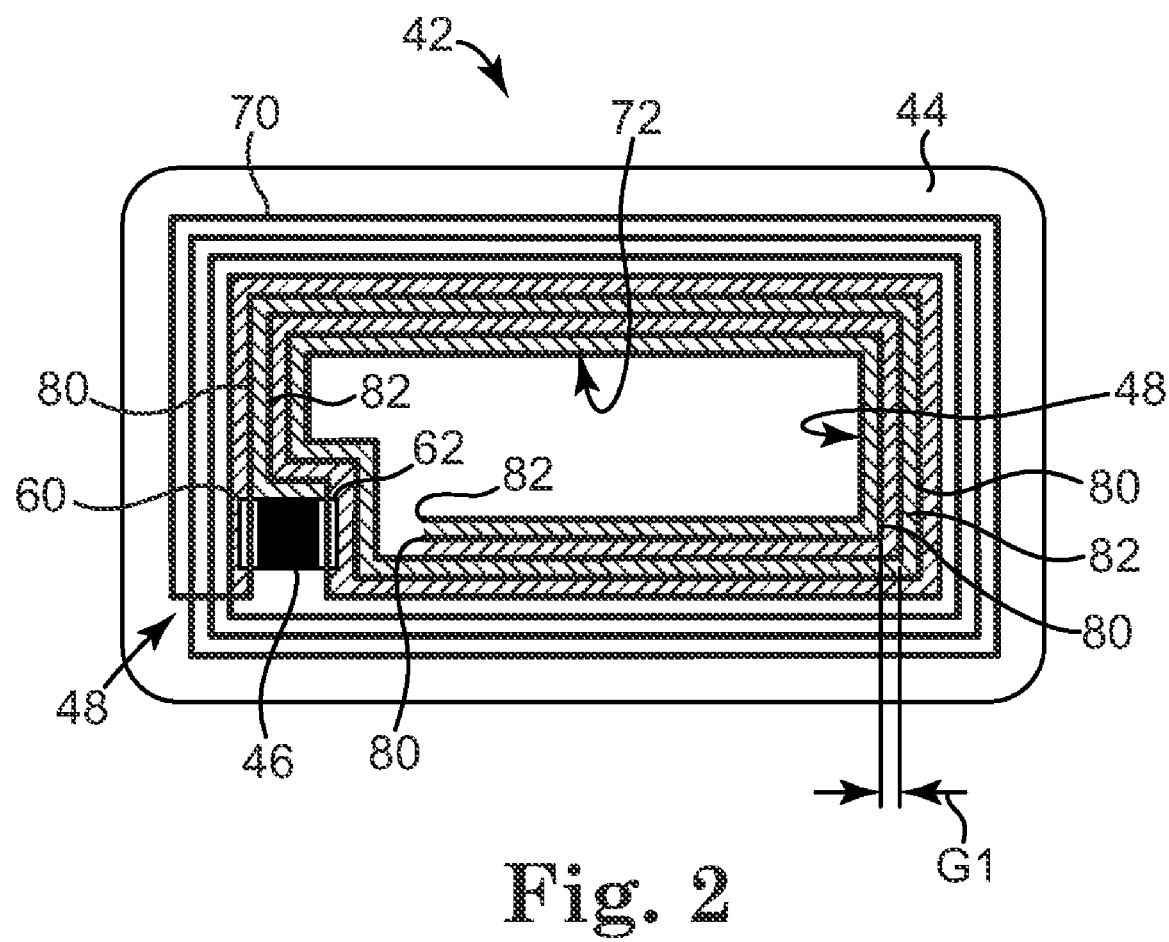
FIG. 2 is a top view of a contactless integrated circuit inlay including a coil according to one embodiment.

FIG. 2 is a top view of the integrated circuit inlay 42 according to one embodiment. In one embodiment, inlay 42 includes substrate 44, chip 46 coupled to substrate 44, and coil 48, where coil 48 includes an antenna portion 70 and a line capacitor 72 that is configured to be selectively tuned to balance the capacitance of the integrated circuit 46 and thus tune the resonance frequency of the contactless integrated circuit inlay 42. In one embodiment, line capacitor 72 is disposed on substrate 44 entirely within a perimeter of antenna portion 70.

Chip 46 is coupled to substrate 44 and includes a first terminal 60 and a second terminal 62. In one embodiment, chip 46 is a two pin chip and includes molding compound on an exposed surface and provides terminals 60, 62 that are configured for coupling to coil 48. In one embodiment, chip 46 has an influx capacitance of between about 27-28 picoFarads, and line capacitor 72 is selectively tuned or adjusted relative to the inductance of antenna portion 70 to provide a resonance frequency for the inlay 42 circuit between about 15-17 MHz.

Coil 48 is electrically coupled to chip 46 and coupled to substrate 44. In one embodiment, antenna portion 70 extends from first terminal 60 in a coiled fashion having multiple turns that decrease in radius, ultimately connecting to second terminal 62. In one embodiment, line capacitor 72 includes a first conductor 80 extending from first terminal 60 and a second conductor 82 extending from second terminal 62. First conductor 80 is adjacent to second conductor 82. In one embodiment, first conductor 80 is sandwiched between successive turns of second conductor 82.

In one embodiment, first conductor 80 extends from first terminal 60 in a pattern of turns having a decreasing radius (i.e., each turn results in the next turn being disposed within a perimeter of the previous turn). In one embodiment, second conductor 82 likewise is disposed on substrate 44 in a pattern of turns having a decreasing radius. Although a rectangular pattern of turns having a decreasing radius is illustrated, it is to be understood that the pattern of turns could be formed to be a circular pattern of turns having a decreasing radius. Other shapes and patterns for the turns are also acceptable. In addition, for some forms of inlays, first conductor 80 and second conductor 82 are disposed in straight lines, depending upon the inductance provided by the antenna portion 70 and the desired resonance frequency for the inlay. In some embodiments, first conductor 80 and second conductor 82 are disposed on substrate 44 in meandering paths.

In one embodiment, first conductor 80 is separated by a distance G1 from second conductor 82 where the line capacitance of the line capacitor 72 is inversely proportional to G1 and directly proportional to a length of the first conductor 80 and a length of second conductor 82. In one embodiment, distance G1 between first conductor 82 and second conductor 82 is between about 100-500 micrometers.

In one embodiment, antenna portion 70 is selected to have good conductance and low resistance for relatively high current flow. Suitable materials for antenna portion 70 include copper, gold, or silver. In general, first and second conductors 80, 82 have minimal current flow such that conductors 80, 82 may be fabricated from any suitable metal material. Suitable exemplary materials for forming first conductor 80 and second conductor 82 include aluminum, copper, alloys of aluminum, or alloys of copper.

In one embodiment, conductors 80, 82 are deposited on substrate 44 as a conductive etch. In other embodiments, conductors 80, 82 include metal wires that are deposited on substrate 44 such that conductors 80, 82 do not contact one another and are spaced apart from each other by the distance G1 to form the line capacitor 72. Other suitable structures and configurations for the deposition of first conductor 80 and second conductor 82 on substrate 44 are also acceptable.

In one embodiment, antenna portion 70 and line capacitor 72 are disposed on the same side of substrate 44. In another embodiment, antenna portion 70 and line capacitor 72 are disposed on different sides of substrate 44.

In one embodiment, line capacitor 72 is disposed within antenna portion 70 as shown to maximize the area occupied by antenna portion. Subsequently, the length of line capacitor 72 is adjusted to achieve the desired capacitance. In other embodiments, line capacitor 72 is disposed on substrate 44 around, or outside an area, of antenna portion 70.

FIGS. 3A-3D illustrate the fabrication of integrated circuit inlay 42 adapted for use in proximity cards according to one embodiment.

Figure 3A:
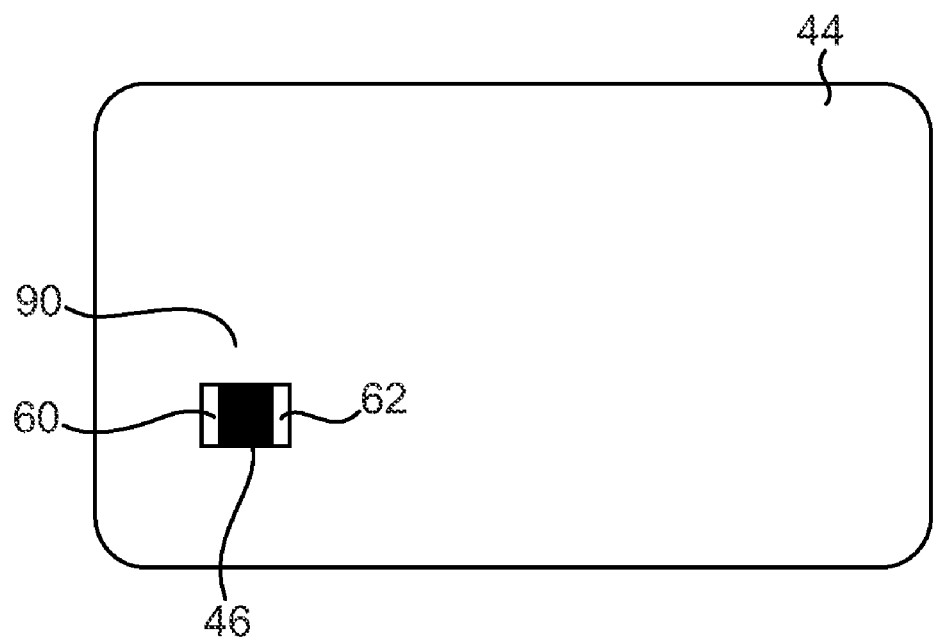
FIG. 3A is a top view of a substrate and a chip attached to the substrate according to one embodiment.

FIG. 3A is a top view of substrate 44 and chip 46 attached to substrate 44. In one embodiment, substrate 44 is flexible, thin (less than about 0.010 inches thick) and includes paper, laminates of paper, or the like, and chip 46 is a passive integrated circuit chip adhesively attached to a first surface 90 of substrate 44.

Figure 3B:
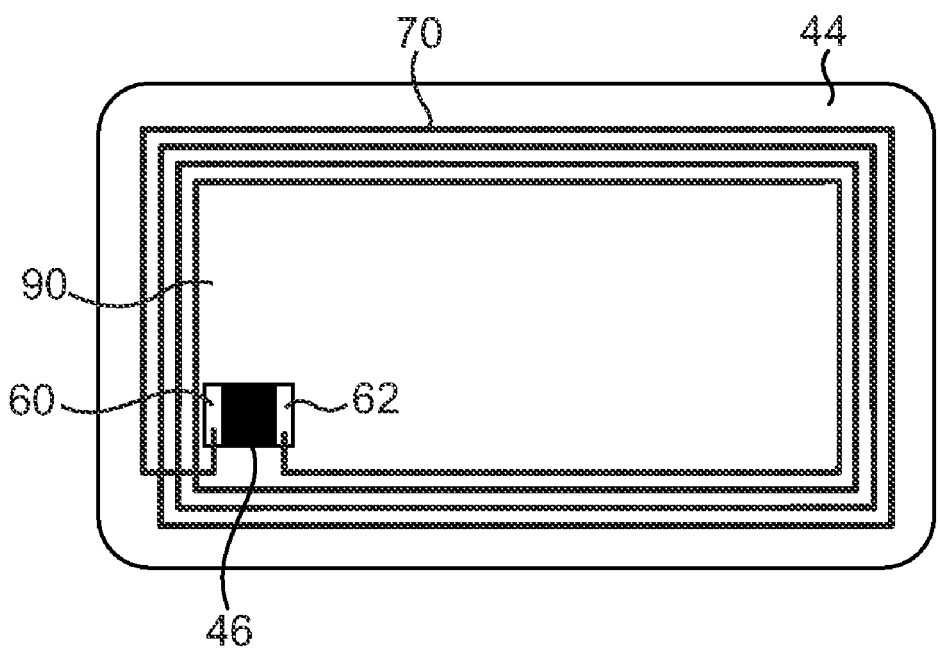
FIG. 3B is a top view of an antenna portion disposed on the substrate shown in FIG. 3A.

FIG. 3B is a top view of antenna portion 70 disposed on first surface 90 of substrate 44. In one embodiment, antenna portion 70 includes copper and is configured to have good conductance and low resistance for relatively high current flow and communicates at a frequency of about 13.56 MHz. Other forms of coils or other forms of antennas are also acceptable. In one embodiment, antenna portion 70 is metal etched onto first surface 90. In another embodiment, antenna portion 70 includes metal wires bonded onto first surface 90.

Figure 3C:
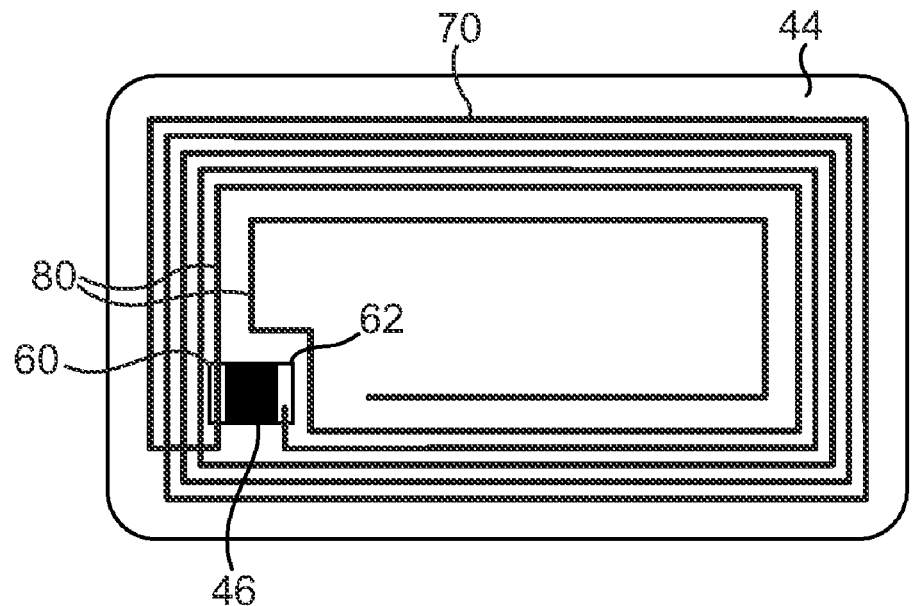
FIG. 3C is a top view of a first conductor line disposed on the substrate shown in FIG. 3B.

FIG. 3C is a top view of first conductor line 80 extending from first terminal 60 and disposed on first surface 90 of substrate 44. First conductor line 80 is deposited on surface 90 within a perimeter of antenna portion 70. In one embodiment, first conductor line 80 is metal etched from copper or aluminum onto first surface 90. In another embodiment, first conductor line 80 includes metal wires, such as copper wires, bonded onto first surface 90.

Figure 3D:
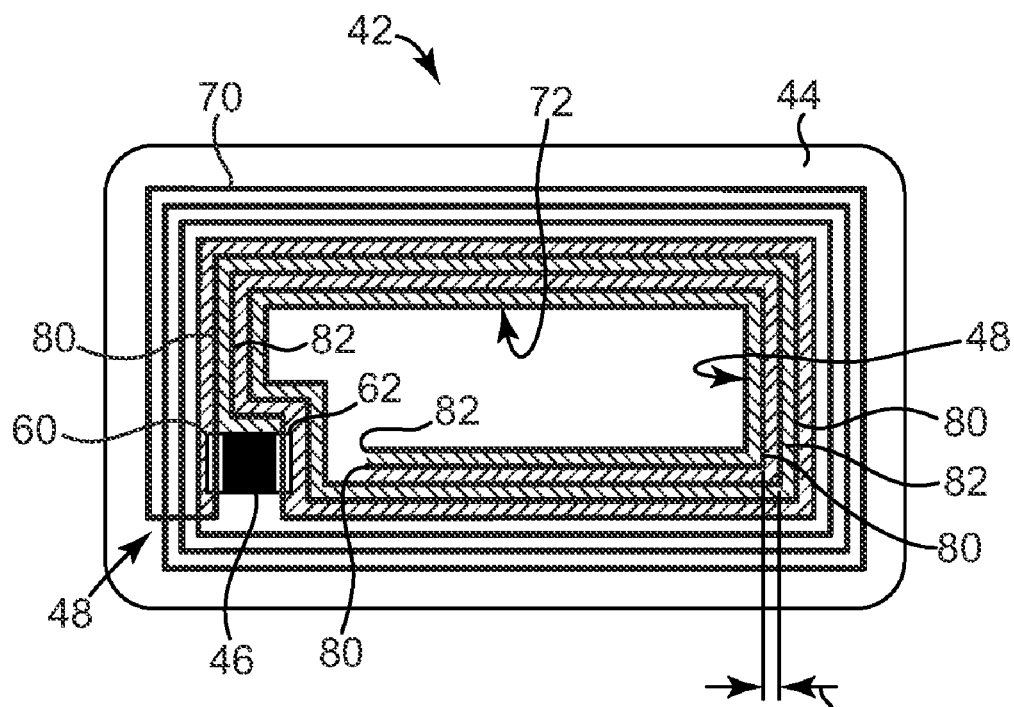
FIG. 3D is a top view of a contactless integrated circuit inlay including a line capacitor including another conductor line disposed on the substrate shown in FIG. 3C.

FIG. 3D is a top view of the contactless integrated circuit inlay 42 including line capacitor 72 disposed on substrate 44 within a perimeter of antenna portion 70. Line capacitor 72 includes second conductor line 82 extending from second terminal 62 and disposed on first surface 90 of substrate 44 spaced by a distance G1 away from first conductor line 80. In one embodiment, second conductor line 82 is metal etched from copper or aluminum onto first surface 90. In another embodiment, second conductor line 82 includes metal wires, such as copper wires, bonded onto first surface 90. Conductor lines 80, 82 are adjacent one to the other in a sandwich structure. The gap G1 between lines 80, 82 defines a capacitive distance between the conductors that is tunable by adjusting a length of one or both conductor lines 80, 82, or by adjusting a width of one or both conductor lines 80, 82, or by adjusting G1 between one or both conductor lines 80, 82. In this manner, the inductance value of the antenna portion 70 is optimized for a desired size of inlay 42, and the line capacitor 72 is tuned for a capacitance value that results in a desired resonance frequency for the inlay.

Figure 4A:
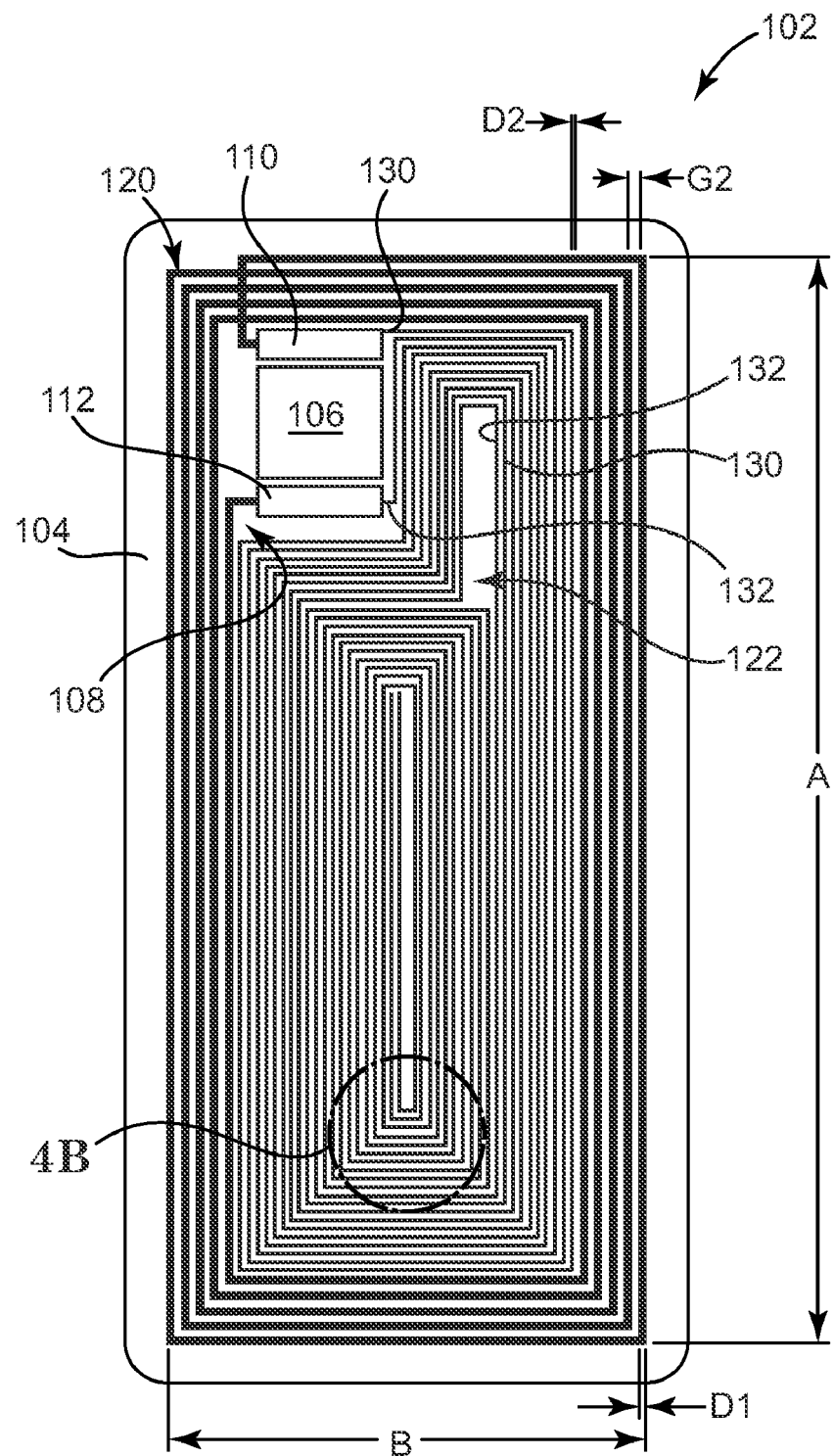
FIG. 4A is a top view of a contactless integrated circuit inlay including a coil according to another embodiment.
Figure 4B:
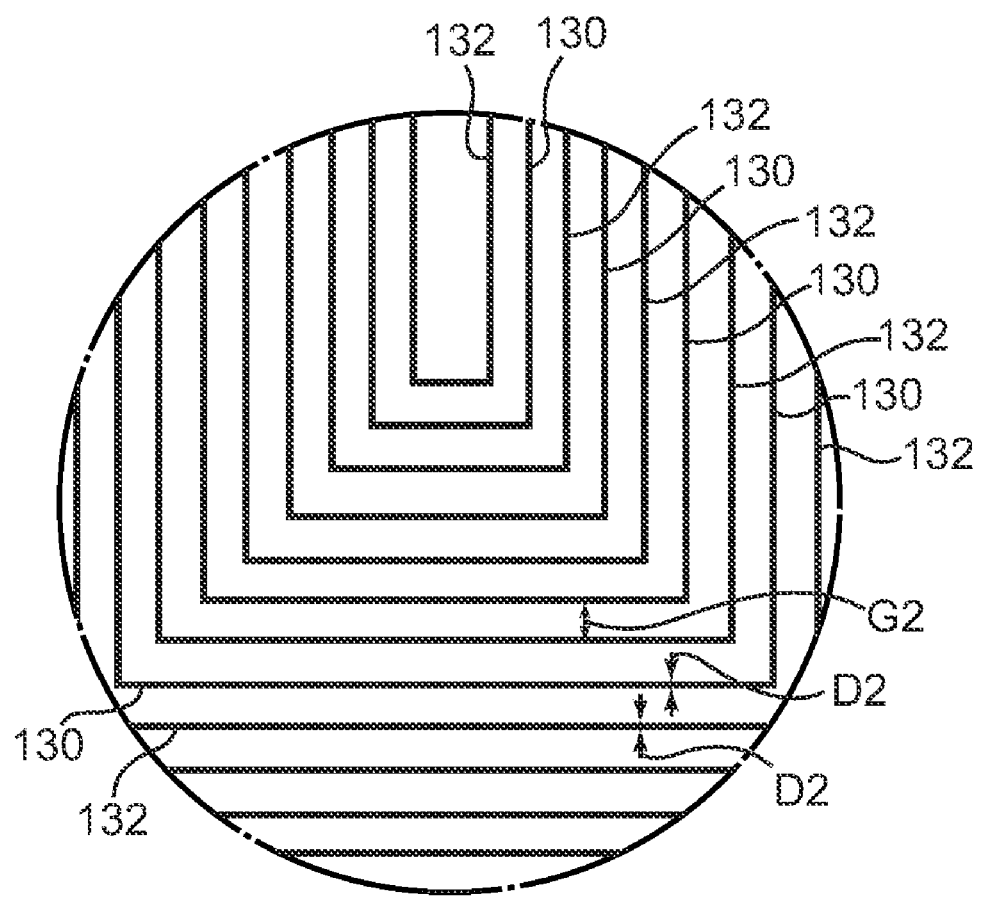
FIG. 4B is an enlarged top view of a portion of the coil shown in FIG. 4A.

FIG. 4A is a top view of a contactless integrated inlay 102 including a coil 108 according to another embodiment, and FIG. 4B is an enlarged top view of a portion of coil 108. Inlay 102 includes a substrate 104, an integrated circuit 106 or chip 106 coupled to substrate 104, and a coil 108 electrically coupled to chip 106 and coupled to substrate 104. One suitable substrate 104 includes a paper substrate or the substrates 44 described above. In one embodiment, chip 106 includes a first terminal 110 and a second terminal 112, and coil 108 includes an antenna portion 120 coupled between first and second terminals 110, 112 of chip 106 and a line capacitor 122 extending from chip 106.

In one embodiment, line capacitor 122 includes a first conducting line 130 extending from first terminal 110 and a second conducting line 132 extending from second terminal 112. In one embodiment, line capacitor 122 is disposed within a perimeter of antenna portion 120. First and second conducting lines 130, 132 are generally parallel to one another and are disposed on substrate 104 in a pattern of turns having a decreasing radius.

In one embodiment, antenna portion 120 includes a copper line having a lateral dimension D1 that is disposed on substrate 104 in a pattern of turns having a decreasing radius. In one embodiment, each of the conducting lines 130, 132 has a lateral dimension D2 and a space between conducting lines 130, 132 of G2. In one embodiment, the lateral dimension D1 of antenna portion 120 is between about 200-800 micrometers, and preferably D1 is about 500 micrometers. The lateral dimension D2 of conducting lines 130, 132 is between about 100-300 micrometers, and preferably the lateral dimension D2 of conducting lines 130, 132 is about 200 micrometers. In one embodiment, the gap G2 between conducting lines 130, 132 is on the order of the dimension D2 and in one embodiment is about 200 micrometers. In one embodiment, the turns of antenna portion 120 have a lateral dimension of D1 and are also spaced one from the other by the dimension G2, or about 200 micrometers.

In one embodiment, antenna portion 120 defines an outside perimeter having dimensions A×B, where A is about 52 millimeters and B is about 23 millimeters. Other suitable dimensions for coil 108 of inlay 102 are also acceptable. In one embodiment, the dimension A is greater than the dimension B such that the length of parallel conducting lines 130, 132 is maximized, thus enabling a broad range in which to tune the capacitance of line capacitor 122.

The line capacitance of line capacitor 122 is tunable or adjustable by selectively varying gap G2 and a length of one or both of conducting lines 130, 132. In one embodiment, conducting lines 130, 132 are disposed on substrate 104 in a pattern of turns that is highly amenable to adjustments in length of conducting lines 130, 132, which is beneficial in tuning line capacitance for inlay 102.

In on exemplary embodiment, antenna portion 120 is formed of etched copper having a lateral dimension D1 of about 500 micrometers, the turns of the antenna portion 120 spaced about 200 micrometers apart, and each conducting line 130, 132 is etched of copper to have a lateral dimension D2 of about 200 micrometers with a gap G2 of about 200 micrometers between each conducting line 130, 132.

In one embodiment, antenna portion 120 defines a perimeter, and line capacitor 122 is disposed on substrate 104 entirely within the perimeter of antenna portion 120.

Figure 5:
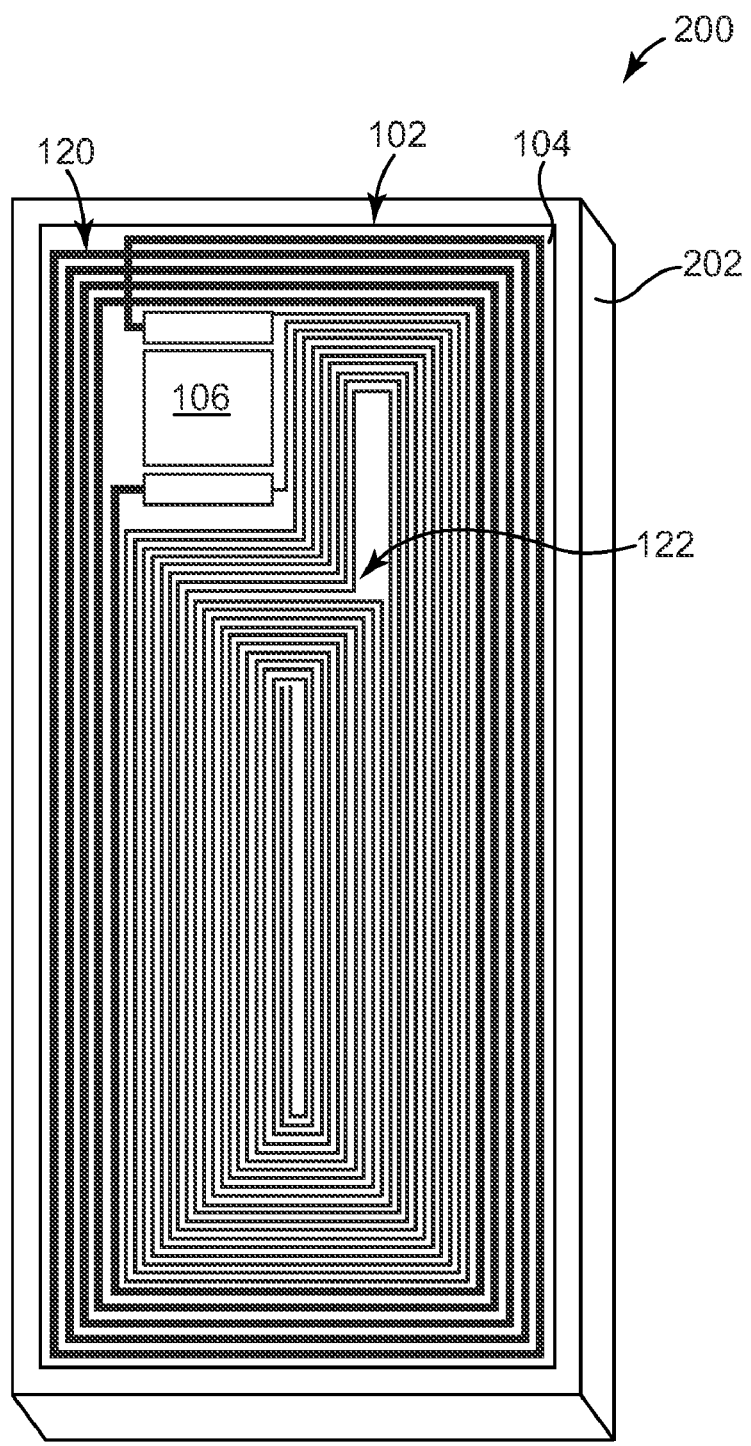
FIG. 5 is a top view of a contactless integrated circuit card including the inlay shown in FIG. 4A.

FIG. 5 is a top view of a contactless integrated card 200 according to one embodiment. Card 200 includes a carrier 202 and inlay 102 (FIG. 3) disposed on carrier 202. Inlay 102 is illustrated as "on top" of carrier 202, although it is to be understood that inlay 102 is fabricated to be laminated to various forms of carriers, and can include sandwich structures of inlay 102 between carrier 202 layers, or under one or more carrier 202 layers.

Inlay 202 includes substrate 104, chip 106, antenna portion 120, and line capacitor 122 as described above. In one embodiment, contactless integrated circuit card 202 has a form factor approximately the size of a credit card, is flexible, and is configured for electronic transfers of data and information between chip 106 and a reader/writer such as reader/writer 22 described above. To this end, contactless integrated card 200 is light weight, flexible, and portable in a wallet or handbag.

Embodiments of a contactless integrated circuit inlay are provided having a line capacitor including tunable conducting lines that are configured to tune and adjust the resonance frequency of the circuit.

Embodiments provide a highly adjustable and tunable line capacitor configured to provide an adjustable level of capacitance that enables tuning the resonance frequency of an integrated circuit chip to allow efficient power transfer between the contactless reader and the card. Embodiments of the line capacitors having tunable capacitance values enable the optimization of the coil inductance on the inlay to balance the power transfer to the card and the relay signal to the reader.

The above described line capacitors are configured for deposition onto a single side of an inlay substrate. In some embodiments, line conductors are fabricated from inexpensive and reliable wire coil conducting lines. The line capacitors described above provide high capacitance values and simple tuning by a variation in the length of the line conductor. In one embodiment, the line capacitor is metal etched or layered and the capacitance tolerances are configured to be minimized by selectively adjusting distances between the conducting lines.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of a contactless integrated circuit inlay and card including a sandwiched turn capacitance coil. Therefore, it is intended that this invention be limited only by the claims and the equivalents thereof.

What is claimed is:

1. An integrated circuit device including a contactless integrated circuit inlay, the integrated circuit device comprising:
   a substrate;
   an integrated circuit coupled to the substrate; and
   a coil electrically coupled to the integrated circuit and coupled to the substrate, the coil comprising a line capacitor;
   wherein the coil comprises a first conductive line disposed in multiple turns on the substrate and a second conductive line disposed in multiple turns on the substrate.

2. The integrated circuit device of claim 1, wherein the second conductive line is sandwiched between successive turns of the first conductive line.

3. The integrated circuit device of claim 1, wherein the first conductive line is sandwiched between successive turns of the second conductive line.

4. The integrated circuit device of claim 1, wherein the coil comprises an antenna portion electrically coupled between a first terminal and a second terminal of the integrated circuit.

5. The integrated circuit device of claim 4, wherein the first conductive line extends from the first terminal and the second conductive line extends from the second terminal.

6. The integrated circuit device of claim 1, wherein the first conductive line and the second conductive line comprise a conductive etch.

7. The integrated circuit device of claim 1, wherein the first conductive line and the second conductive line comprise a metal wire that is disposed on the substrate.

8. The integrated circuit device of claim 1, wherein the first and second conductive lines do not contact each other.

9. A contactless integrated circuit inlay comprising:
   a substrate;
   an integrated circuit coupled to the substrate;
   a coil electrically coupled to the integrated circuit and coupled to the substrate; and
   a line capacitor extending from the integrated circuit, the line capacitor separate from the coil and comprising a first conductor disposed on a first surface of the substrate adjacent to a second conductor disposed on the first surface of the substrate.

10. The contactless integrated circuit inlay of claim 9, wherein the coil comprises an antenna configured to communicate at about 13.56 MHz and the line capacitor is disposed on the first surface of the substrate entirely within a perimeter of the antenna.

11. The contactless integrated circuit inlay of claim 9, wherein the second conductor extends from a terminal of the integrated circuit and is disposed on the substrate in a pattern of turns having a decreasing radius and the first conductor is disposed between two adjacent turns of the second conductor.

12. The contactless integrated circuit inlay of claim 9, wherein the first conductor extends from a terminal of the integrated circuit and is disposed on the substrate in a pattern of turns having a decreasing radius and the second conductor is disposed between two adjacent turns of the first conductor.

13. The contactless integrated circuit inlay of claim 9, wherein the first conductor and the second conductor each comprise a conductive etch.

14. The contactless integrated circuit inlay of claim 9, wherein the first conductor and the second conductor comprise a metal wire that is disposed on the substrate.

15. The contactless integrated circuit inlay of claim 9, wherein the second conductor is spaced a distance away from the first conductor by between about 150-250 micrometers.

16. A contactless information read/write system comprising:
   a reader/writer configured to generate electromagnetic waves; and
   a card including a coil configured to wirelessly communicate with the electromagnetic waves of the reader/writer, the card comprising an integrated circuit inlay including a chip disposed on a substrate;
   wherein the coil is electrically coupled to the chip and comprises a first line conductor disposed on a first surface of the substrate between at least two turns of a second line conductor disposed on the first surface of the substrate; and
   wherein the coil comprises an antenna portion electrically coupled between a first terminal and a second terminal of the integrated circuit and a line capacitor including the first and second line conductors.

17. The system of claim 16, wherein the first line conductor is disposed in multiple turns on the first surface of the substrate.

18. The system of claim 16, wherein the second line conductor is sandwiched between multiple successive turns of the first line conductor.

19. The system of claim 16, wherein the first line conductor is sandwiched between successive turns of the second line conductor.

20. The system of claim 16, wherein the line capacitor is disposed entirely within a perimeter of the antenna portion.

21. A method of fabricating an integrated circuit inlay comprising:
   providing a substrate including an integrated circuit coupled to the substrate;
   depositing a coil on the substrate and coupling the coil to the integrated circuit;
   depositing a first conductor line on the substrate that is connected to the integrated circuit; and
   depositing a second conductor line on the substrate that is connected to the integrated circuit and adjacent to the first conductor line such that the first conductor line and the second conductor line provide a line capacitor.

22. The method of claim 21, wherein depositing a first conductor line on the substrate comprises depositing multiple turns of a first conductor line on the substrate within a perimeter of the coil.

23. The method of claim 22, wherein depositing multiple turns of a first conductor line on the substrate comprises etching multiple turns of a first metal conductor line on the substrate, each succeeding turn having a radius that is less than a radius of a previous turn.

24. The method of claim 23, wherein depositing a second conductor line on the substrate adjacent to the first conductor line comprises etching multiple turns of a second conductor line on the substrate between the turns of the first metal conductor line.

25. The method of claim 24, further comprising:
   selectively tuning inductance of the inlay by selectively spacing the second conductor line between the turns of the first metal conductor line.

* * * * *